United States Patent Office 3,397,235
Patented Aug. 13, 1968

---

3,397,235
PHENYLHYDRAZINO-PROPANETHIOLS
Leonard Levine, Lake Jackson, Tex., assignor to The Dow Chemical Company, Midland, Mich., a corporation of Delaware
No Drawing. Filed Aug. 29, 1966, Ser. No. 575,536
1 Claim. (Cl. 260—569)

This invention is concerned with organic chemical compounds and is particularly directed to the novel compound 1-(2-phenylhydrazino)-2-propanethiol of the formula:

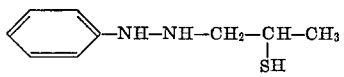

Under normal conditions, the novel propanethiol is a clear yellow liquid soluble in acetone and benzene and only slightly soluble in water. The compound is useful as a herbicide and also as a curing agent for epoxy resins.

The compounds of the present invention are prepared by the reaction of phenylhydrazine with propylene sulfide. The reaction takes place readily, consuming equimolar amounts of the starting materials. The reactants may be contacted together in any proportions from about 0.5 to about 20 moles of phenylhydrazine per mole of propylene sulfide. However, an excess of propylene sulfide is not desirable, and it is the preferred procedure to employ from about 2 to 5 moles of phenylhydrazine for each mole of propylene sulfide.

In carrying out the reaction to prepare the novel compounds, phenylhydrazine and propylene sulfide are contacted together. The reaction can take place without a solvent, but in a convenient procedure, a non-polar inert organic solvent is employed as a reaction medium. Representative non-polar organic solvents include toluene, xylene and diethyl ether. The reaction mixture is heated to a temperature of 135°–140° C. under pressure for a few hours. The resulting product may be separated from the reaction mixture by such conventional procedures as evaporation and distillation. The product may be further purified by distillation.

The following example, without more, will enable those skilled in the art to practice the present invention.

EXAMPLE

Phenylhydrazine (108 grams; 1 mole) and propylene sulfide (37 grams; 0.5 mole) were added to 110 milliliters of toluene in a citrate bottle. The citrate bottle was sealed and then placed in a rotating steam-heated autoclave. The reaction mixture in the sealed citrate bottle was maintained at a temperature of 135°–140° C. for 1.5 hours in the rotating autoclave. The mixture was distilled in vacuo, yielding a yellow liquid as a residue after removal of the volatile components. The yellow liquid was distilled and found to boil at 95°–108° C. under a pressure of 0.3–0.5 millimeter of mercury. The 1-(2-phenylhydrazino)-2-propanethiol product was collected as a fraction boiling at 107°–108° C. under a pressure of 0.5 millimeter of mercury. The product was a clear yellow liquid with a refractive index, $n_D^{24} = 1.588$. The product was found by analysis to have a nitrogen content of 15.1 percent as compared with a theoretical nitrogen content of 15.4 percent calculated for the named structure. The structure of the product was confirmed by infrared spectroscopy and by nuclear magnetic resonance analysis. The addition of two drops of the product to 6 milliliters of an aqueous acidified copper sulfate solution yielded a black precipitate.

In typical preparations in accordance with the foregoing example, it is found that the crude product contains minor proportions of the isomeric compound 2-(2-phenylhydrazino)-1-propanethiol. In a representative operation, about 17 percent of the latter isomer was detected in the product mixture by nuclear magnetic resonance analysis. Such products containing small amounts of isomers in admixture with the principal 2-propanethiol compound may be employed for the same uses as said principal compound.

The product is useful as a herbicide. The application of aqueous compositions containing the product of the above example as the sole toxicant therein at a concentration of 5,000 parts per million by weight to cucumber and crabgrass plants resulted in substantially complete kills of said plants. In similar operations, excellent kills and control of pigweeds were obtained when aqueous compositions containing the compositions of the above example as the sole toxicant and at a toxicant concentration of 2,000 parts per million were applied to the pigweeds.

The product is also useful as a curing agent for epoxy resins. One gram of the product from the above example and 3 grams of a liquid epoxy resin DER 331 were mixed together and held at a temperature of 100°–110° C. for 2 hours. The mixture yielded a soft, slightly tacky, clear yellow solid which lost its tackiness upon standing for 2 to 3 days. In other operations, 1 gram of the product from the above example and 2 grams of the above-described liquid epoxy resin were mixed together and held at 100°–110° C. for 2 hours to yield a similar clear yellow solid resin.

I claim:
1. 1-(2-phenylhydrazino)-2-propanethiol.

References Cited

FOREIGN PATENTS 503,135  7/1930  Germany.

CHARLES B. PARKER, *Primary Examiner.*

ROBERT V. HINES, *Assistant Examiner.*